United States Patent
Cappa et al.

[11] Patent Number: 5,848,767
[45] Date of Patent: Dec. 15, 1998

[54] ONE PIECE SPACECRAFT FRAME

[75] Inventors: James O. Cappa, Bonnie Lake; Harry W. Dursch, Bellevue, both of Wash.

[73] Assignee: The Boeing Company, Seattle, Wash.

[21] Appl. No.: 693,863

[22] Filed: Aug. 5, 1996

[51] Int. Cl.$^6$ .................................................. B64G 1/10
[52] U.S. Cl. .................................. 244/158 R; 244/117 R
[58] Field of Search ........................... 244/158 R, 117 R, 244/119, 133

[56] References Cited

U.S. PATENT DOCUMENTS

| | | | |
|---|---|---|---|
| 4,682,744 | 7/1987 | Gounder | 244/133 |
| 5,474,262 | 12/1995 | Fiore | 244/158 R |
| 5,567,499 | 10/1996 | Cundiff et al. | 244/133 |
| 5,569,508 | 10/1996 | Cundiff | 244/133 |

*Primary Examiner*—Galen L. Barefoot
*Attorney, Agent, or Firm*—Christensen O'Connor Johnson & Kindness, P.L.L.C.

[57] ABSTRACT

A single piece frame (12) for a spacecraft, the frame manufactured as fiber composite sheets (40, 42) overlaying a core (38). The core (38) is preferably made of aluminum and formed with a honeycomb cross-section. The frame (12) provides a mounting structure to which payload, spacecraft equipment, and boost vehicle are attached. The frame (12) can be reinforced locally by varying the core density or the wall thickness so as to resist concentrated or localized loads. The orientation of the fiber in the composite sheets may also be varied so as to strengthen the frame in a desired location.

18 Claims, 7 Drawing Sheets ns, and cross-ties. The flat panels are typically connected to form a hexagon, an octagon, or another symmetrical shape. The frame and a top deck and a bottom deck make up the outer shell of the spacecraft structure.

ONE PIECE SPACECRAFT FRAME

FIELD OF THE INVENTION

This invention relates to structures and, more specifically, to spacecraft structures.

BACKGROUND OF THE INVENTION

Satellite and small spacecraft typically incorporate a frame (also known as a bus) to which payload, spacecraft equipment, and boost vehicles are attached. The frames generally include a series of flat panels connected and supported by a number of complex fittings, longerons, and cross-ties. The flat panels are typically connected to form a hexagon, an octagon, or another symmetrical shape. The frame and a top deck and a bottom deck make up the outer shell of the spacecraft structure.

During launch, a spacecraft frame will typically undergo a large number of forces, generally, the result of combined vibro-acoustic and vibrational loads. To best handle these launch environmental conditions, it is preferred that the number of joints between parts, or frame pieces, be minimized. In the past, because of structural and mechanical support requirements, it has been difficult to eliminate many of the parts or minimize the number of joints. For example, because the flat panels of the frames have to handle compressive and shear loads, they are often backed by rib stiffeners to prevent buckling. The rib stiffeners are fastened to the panels by bolts, welding, or other well known methods. The metallic longerons and cross-ties are also mechanically fastened to the panels. The end result is a large number of joints. The number of joints is a factor to be taken into consideration when determining the "efficiency" of a spacecraft structure. During the dynamic analysis of spacecraft structures, a knock-down factor of 20%–25% is typically applied to spacecraft fundamental frequencies to account for joint inefficiencies.

A manufacturer of spacecraft frames seeks to minimize the weight of the frame, so that a large portion of the spacecraft weight can be apportioned to the payload. In addition to being lightweight, the frame should be thermally conductive. More specifically, because many of the heat producing electrical components and spacecraft equipment are mounted directly to the frame, the body of the frame serves as a thermal fin to dissipate heat from these components. If not, heat must be dissipated in some other manner, adding weight. In order to meet this thermal conductivity requirement, it is desirable that a majority of the elements of the prior art spacecraft frames are made of aluminum. Aluminum has a relatively high coefficient of thermal conductivity and is relatively light in weight. However, despite their aluminum construction, prior art spacecraft frames, because of their many components, fittings, joints, and reinforcing members, are often bulky, heavy, and difficult to manage.

Some manufacturers of spacecraft frames have tried to address the problems of weight and bulkiness by substituting fiber-composite pieces for aluminum frame pieces. Frames incorporating composite pieces have been found to be unsatisfactory, because as with the aluminum designs, many parts have been used. Further, thermal conductivity is reduced due to the inconsistent fiber orientation in the separate pieces.

Thus, there is a need for a more efficient, easily produced frame for a spacecraft. Preferably, the frame would be light in weight and include less parts than currently designed spacecraft frames. Further, the spacecraft frame should be thermally conductive.

SUMMARY OF THE INVENTION

The present invention solves many of the above problems by providing a single piece spacecraft frame. The spacecraft frame is manufactured as fiber composite sheets overlaying a core. The core is preferably made of aluminum and formed with a honeycomb cross-section. The frame provides a structure to which payload, spacecraft equipment, and boost vehicles can be attached. The frame can be reinforced locally by varying the core density or the wall thickness so as to resist concentrated or localized loads. Thus, a spacecraft frame formed in accordance with this invention has several advantages over prior art spacecraft frames. These advantages include a reduced number of parts, easier assembly, more payload capacity because of fewer part joints, and lighter weight.

More particularly described, the present invention provides a spacecraft frame having a core configured in the shape of the outer shell of the spacecraft and a first composite layer comprising fibers in a polymer matrix and covering the inside of the core. A second composite layer comprising fibers in a polymer matrix covers the outside of the core. The core has a honeycomb structure and is made of a one-piece aluminum sheet formed to the shape of the frame. Also, the first and second composite layers are substantially continuous, i.e., they do not contain seams.

In an exemplary embodiment, the first and second composite layers have cyanate ester in the polymer matrix. Another embodiment uses epoxy for the matrix. Preferably, the fibers in the first and second composite layers comprise high modulus graphite making up approximately 53 to 55 volume percent of the first and second composite layers. The core may include walls that are thickened regionally to support higher loads, or may have a honeycomb structure with the structure being more dense in a specific region.

The present invention also provides a method of making a frame defining an inner wall and an outer wall. The method includes the steps of providing a mandrel having an outer contour substantially the shape and size of the inner wall of the frame, applying a first prepreg sheet formed from a composite comprising fiber in a polymer matrix to the outer contour of the mandrel, applying a core to the outer portion of the first prepreg sheet, applying a second prepreg sheet formed from a composite comprising fiber in a polymer matrix to the outside of the core, curing the first and second prepreg sheets in an autoclave, and removing the mandrel.

The exemplary method of performing these steps includes compacting the first prepreg sheet by vacuum before applying the core, and compacting the second prepreg sheet by vacuum before the curing step. Additional layers may also be used for the first and second prepreg, and preferably each of these layers is individually compacted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
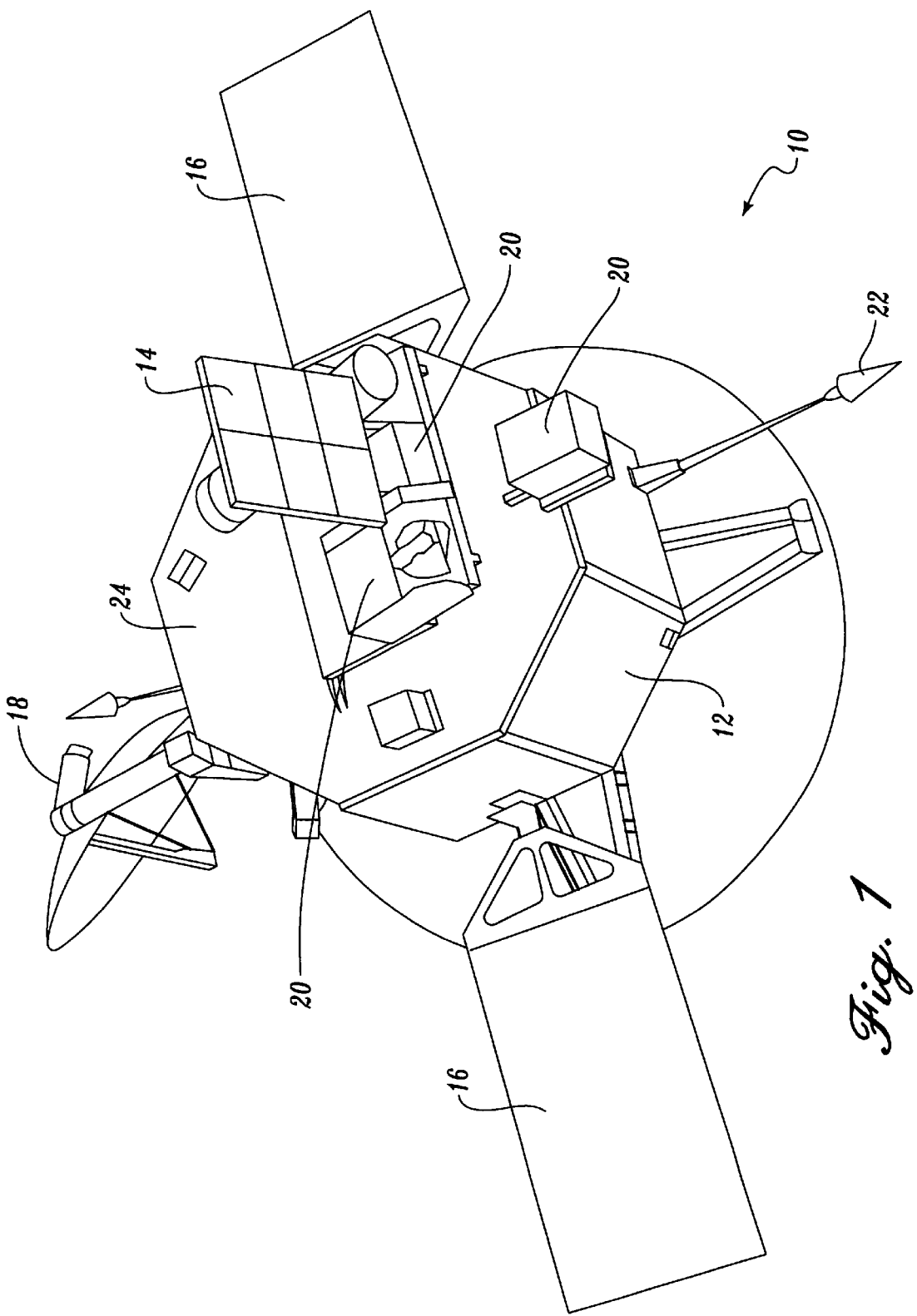
FIG. 1 is a perspective view of a satellite having a frame embodying the present invention.

Referring now to the drawing, in which like reference numerals represent like parts throughout the several views, FIG. 1 illustrates a spacecraft, specifically a satellite 10, incorporating a frame 12 embodying the present invention. The satellite 10 includes typical accessories and navigational equipment, such as a radar antenna 14, solar panels 16, a steerable high-gain antenna 18, and related propulsion equipment (not shown, but well known in the art). The satellite 10, illustrated in the drawing, is used for near earth space exploration, and includes several spectrometers 20 and other equipment designed to gather scientific data to be transmitted back to earth. A low gain antenna 22 is included on one side of the satellite 10 for nadir pointing of the satellite to properly align the spectrometers 20. Although the satellite 10 is described as being used for space exploration, the frame 12 of the present invention may be used in several different spacecraft configurations, including, but not limited to, active repeater satellites, deep space probes, and passive, or reflector, satellites.

Figure 2:
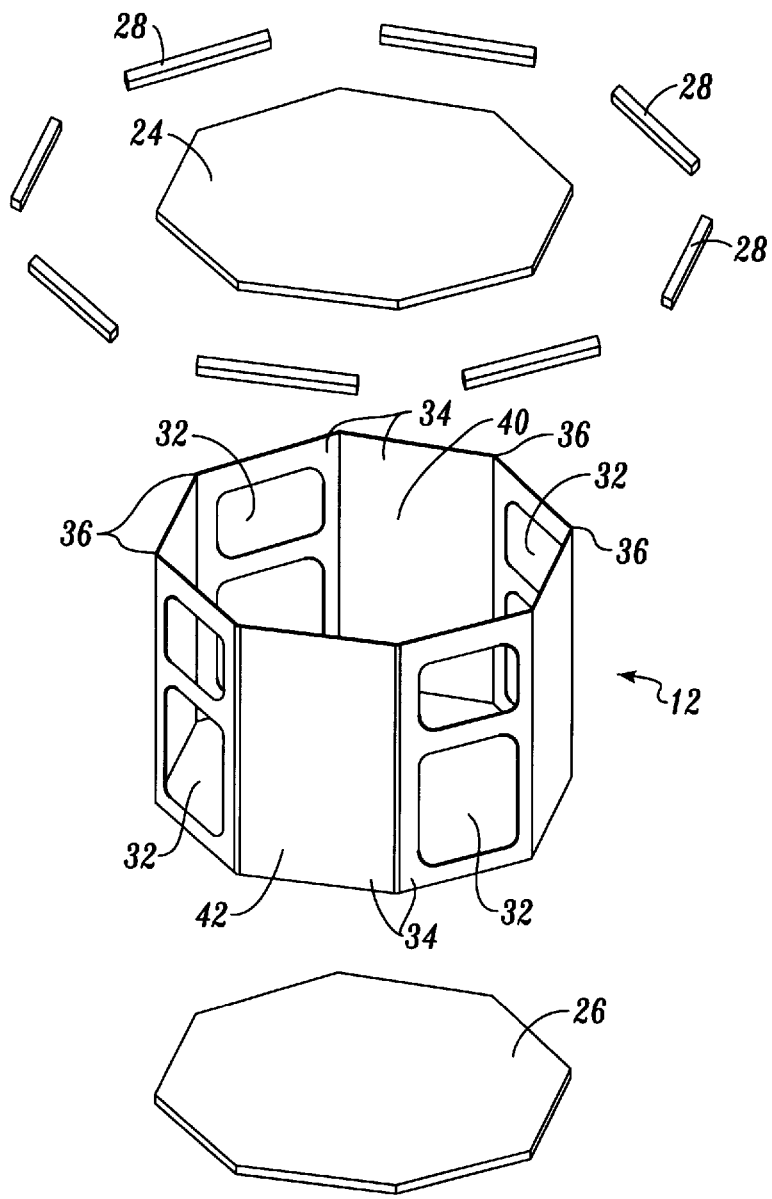
FIG. 2 is an exploded perspective view of the frame for the satellite of FIG. 1, plus associated parts.

The frame 12 shown in FIGS. 1 and 2 has an octagonal cross-section. A top deck 24 and bottom deck 26 are shaped to the profile of the frame 12 and are configured to attach to the top and bottom of the frame, respectively. Eight angled pieces 28 are adapted to extend along the eight sides of the top deck 24. The angled pieces 28 and the decks 24, 26 are attached to the frame 12 in a conventional manner, such as by bonding or typical fasteners. The top deck 24, the bottom deck 26, and the frame 12 comprise the outer structure of the satellite 10. A number of access openings 32 are located in the frame 12 for placing equipment, as described in detail below.

Figure 3:
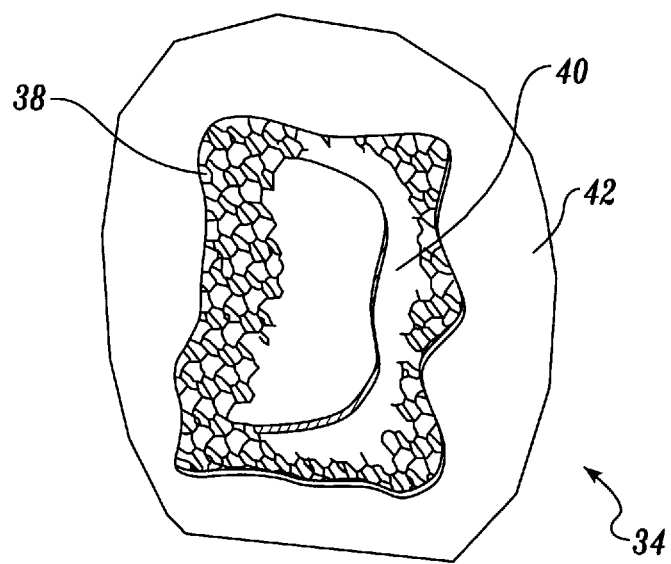
FIG. 3 is a detailed cut-away view of the core and face sheets for the frame of FIG. 2.

The octagonal shape of the frame 12 defines eight walls 34 joined together at eight corners 36 (FIG. 2). As can be seen in the FIG. 3, the walls 34 include a honeycomb core 38 sandwiched between an inner face sheet 40 and an outer face sheet 42. In the exemplary embodiment of the present invention, the honeycomb structure of the core 38 comprises a one-piece panel that encompasses all of the walls 34 and corners 36. The ends of the one-piece panel are joined at the center of one of the walls 34. As will be described in detail below, each of the face sheets 40, 42 is bonded onto the honeycomb structure so as to form a one-piece, no seam structure. The honeycomb core 38, and therefore the frame 12, may be formed in any traditional spacecraft shape, including cylindrical, square, hexagonal, or octagonal shapes.

Preferably, the honeycomb core 38 is a flexible, aluminum sheet. Although the exemplary embodiment contemplates use of an aluminum sheet with a honeycomb cross-section, the core may be formed of other types of sheets as long as they have structural integrity, are light in weight, and have high through-thickness thermal conductivity. In addition, metals other than aluminum, as well as, non-metallic materials that exhibit these properties could be used to form the core 38.

The face sheets 40, 42 are formed by several layers of prepreg sheets 44. The prepreg sheets 44 preferably include a quasi-isotropic ply stack-up and are infiltrated with a polymer matrix. By providing the fibers in a quasi-isotropic formation, the face sheets 40, 42 have a substantially consistent in-plane thermal conductivity in all directions parallel to the face sheets, permitting the face sheets to distribute the thermal loads in-plane efficiently.

The polymer matrix is preferably a cyanate ester, for example Bryte EX1515 brand cyanate ester, produced by Bryte Technologies. Cyanate ester is preferred because, compared to epoxies and other resins, it exhibits significantly less outgassing, moisture desorption and microcracking, thereby reducing the potential during orbit for contamination of optics and sensors, and for dimensional change. Bryte EX1515 cyanate ester is a low temperature (250° F.) cure system, providing lower residual stresses than a higher temperature system. It can be post-cured up to 450° F., if required. Like most cyanate esters, Bryte EX1515 cyanate ester possesses prepreg tack and minimum viscosity similar to epoxies. However, Bryte EX1515 cyanate ester has electrical conductivity high enough to preclude the potential of charge build up during orbit. Alternatively, an epoxy or another resin can be used for the polymer matrix. An example of an epoxy which may be used is Hercules 8551 brand toughened epoxy, produced by Hercules.

The fiber for the prepreg sheets 44 is preferably a high modulus graphite fiber, such as Amoco P100S brand high modulus graphite fiber, produced by Amoco Oil Company. A high modulus fiber is selected because the structure of the frame 12 is generally stiffness critical, and face sheets 40, 42 created from a high modulus fiber exhibit in-plane thermal conductivity (in a quasi-isotropic lay-up) equaling that of aluminum, enabling passive thermal management.

The fiber volume in the prepreg sheet 44 may be varied so as to maximize the mechanical and thermal properties of the fiber and matrix mixture. High fiber volumes result in stiffer and more thermally conductive face sheets 40, 42 per pound of prepreg sheet 44. However, too high a fiber volume results in a large number of voids for the structure. It has been found that approximately 55% fiber volume is an optimal value for the prepreg sheet used to form the frame 12. Fiber volumes ranging between 53% and 55% have also been found to work well.

In forming the frame 12, it is preferred that steps be taken to minimize void content and fiber breakage in the prepreg sheets 44. To prevent such occurrences, a unique method of formation of the frame 12 has been developed.

An aluminum mandrel 45 is fabricated and used as the tool for the frame 12. The aluminum mandrel 45 is sized such that when the mandrel is at the cure temperature for the prepreg sheets 44, the outer surface of the mandrel is sized to be slightly smaller than the intended, final inside dimension of the inner face sheets 40. The significance of this dimension will be described in detail below. Aluminum was chosen because of its advantageous thermal expansion, which permits removal of the cooled mandrel 45 from the frame 12 after curing of the face sheets 42, 44, obviously a person of skill in the art could produce the mandrel out of other metallic or nonmetallic materials commensurate with the objectives of this invention.

Figure 4:
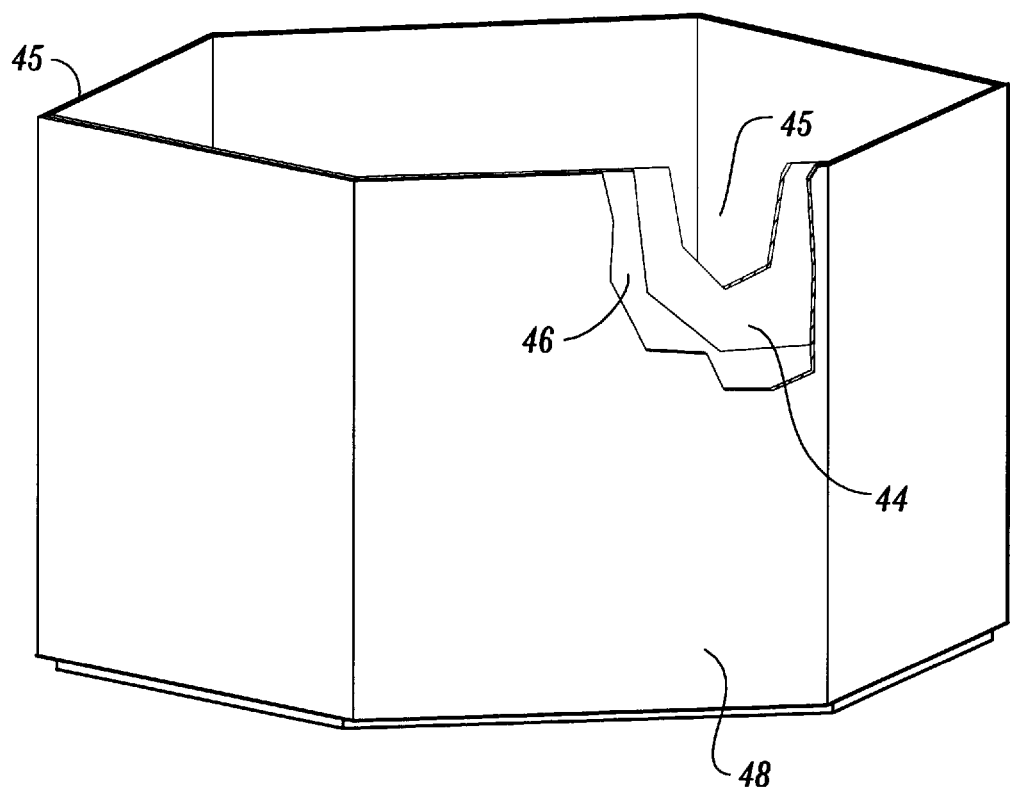
FIG. 4 is a side perspective, partial cutaway view of an aluminum mandrel for manufacturing a six-sided frame incorporating the present invention, the frame shown in a partial state of assembly in which a first prepreg sheet, a flexible blanket, and a fiberglass breather are applied to the outer surface of the mandrel and the assembly is ready for vacuum compaction.
Figure 5:
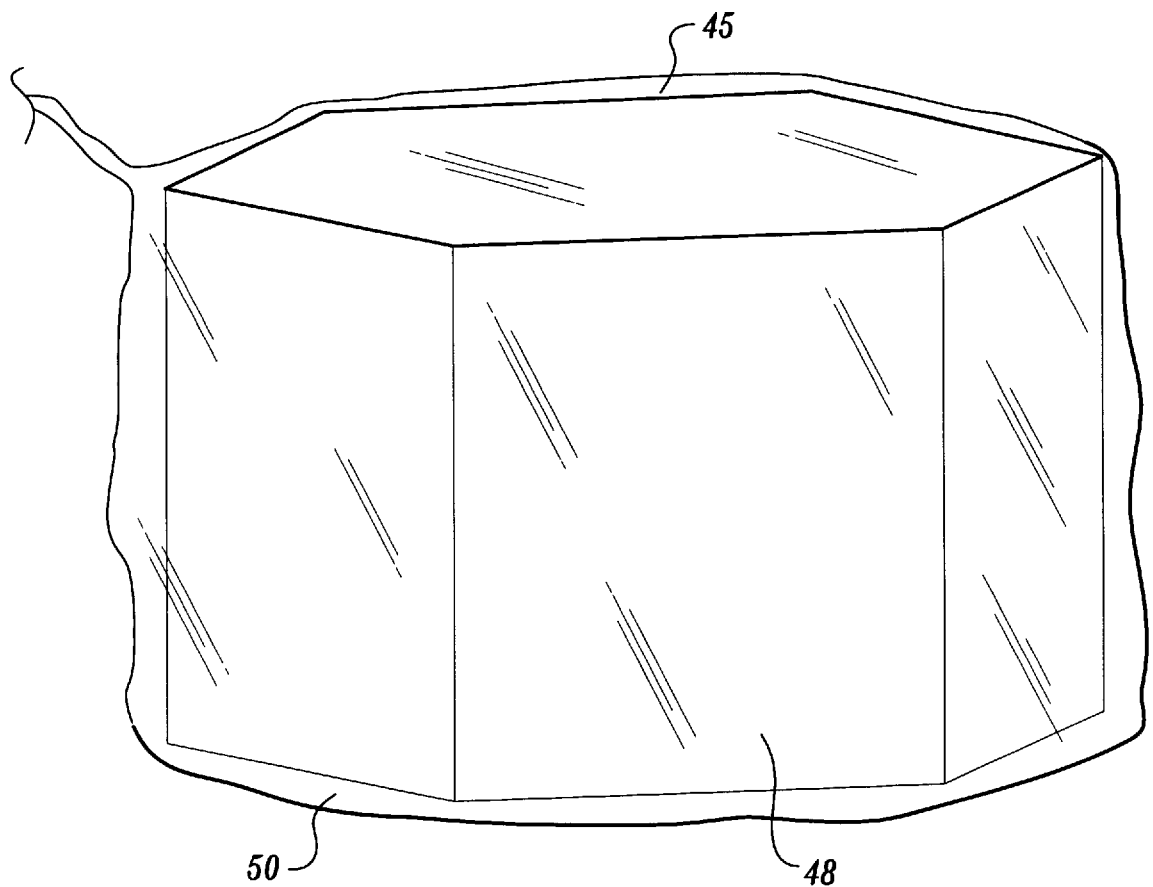
FIG. 5 is a side perspective of the aluminum mandrel shown in FIG. 4 setting forth a further state of assembly of the frame and displaying the assembly shown in a clear vacuum bag and undergoing vacuum packing of the first prepreg sheet layer on the aluminum mandrel.

The process begins by building the inner face sheet 40 around the outer surface of the aluminum mandrel 45. Release agents are (not shown, but well known in the art) applied to the outer surface of the aluminum mandrel 45 to allow easy removal of the frame 12 after curing. A prepreg sheet 44 is then hand packed onto the aluminum mandrel 45. After this compacting, perforated FEP (not shown) is applied to the outside of the prepreg sheet 44, followed by a flexible blanket 46 (FIG. 4). The FEP allows the flexible blanket 46 to be eventually pulled away from the prepreg sheet 44 without taking the prepreg sheet 44 off of the aluminum mandrel 45. A fiberglass breather 48 is applied to the outside of the flexible blanket 46, and a vacuum bag is placed around the entire structure, including the aluminum mandrel 45 (FIG. 5). Vacuum is then applied to the bag 50 so as to compact the prepreg sheet 44 on the outside of the aluminum mandrel 45.

An example of a product that would meet the requirements of the flexible blanket 46 is a one-piece silicone rubber blanket trimmed to a length such that it overlaps itself approximately three to six inches when wrapped around the aluminum mandrel 45, the prepreg sheet 44, and the FEP. The one-piece flexible blanket 46 prevents wrinkling from occurring in the prepreg sheet 44 during compaction. By avoiding wrinkles in the prepreg sheet, fiber breakage is minimized.

After the first prepreg sheet 44 is compacted, another prepreg sheet is applied to the outside of the compacted layer. This prepreg sheet 44 is also hand packed, and, as with the first prepreg sheet, FEP, the flexible blanket 46, the fiberglass breather 48, and the vacuum bag 50 are applied or utilized to compact the prepreg sheet. Additional plys of the prepreg sheets 44 may be added to form the inner face sheet 40 so as to achieve a desired thickness. The number of prepreg sheets 44 needed is determined by the desired structural strength and stiffness of the frame 12. Six plys for both the inner and outer face sheets has been found to produce a satisfactory structure. To achieve low void contents during the curing process, each individual layer of prepreg sheet 44 should be applied separately and should be compacted under vacuum for at least 10 minutes.

Figure 6:
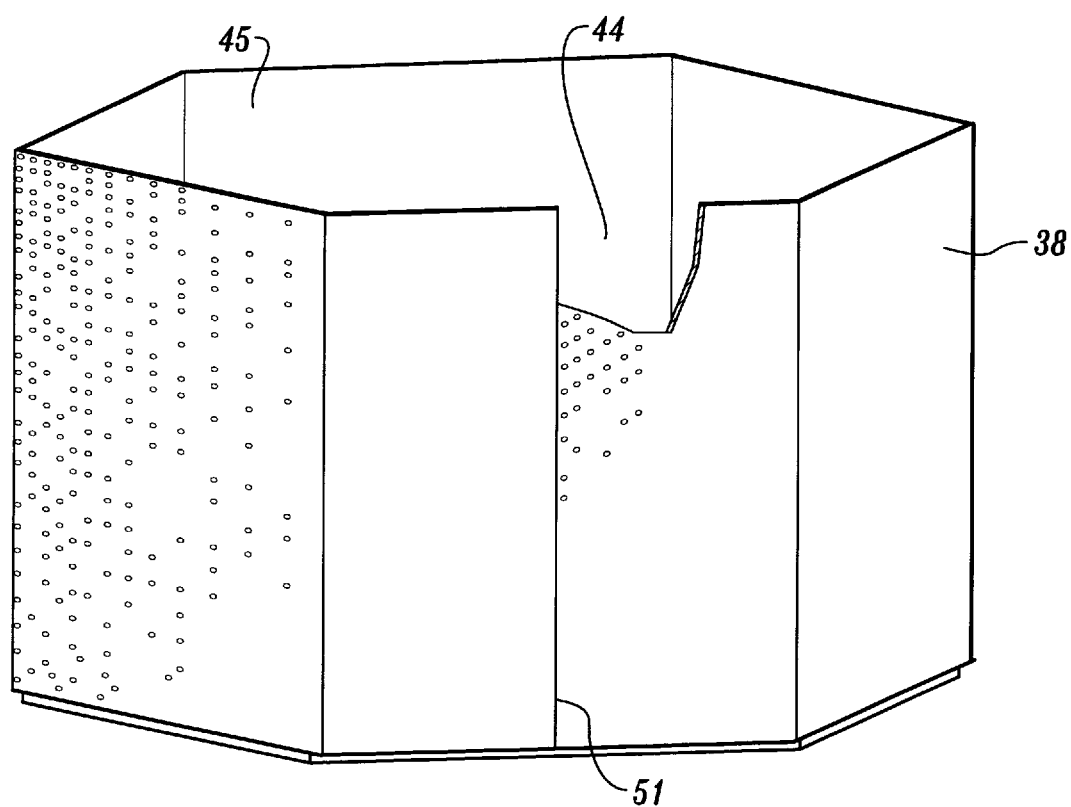
FIG. 6 is a side perspective of the aluminum mandrel shown in FIG. 4 showing still a further state of assembly of the frame and displaying the aluminum core being placed on the prepreg sheets making up the inner face sheet of the frame.

After a desired number of prepreg sheets 44 are applied to form the inner face sheet 40, the honeycomb core 38 is placed along the outside of the outermost layer of the prepreg sheets 44. The honeycomb core 38 is bent and formed around the shape of the aluminum mandrel 45 until opposite ends touch to form a seam 51 (FIG. 6). Preferably, the seam 51 will be positioned near the center of one of the walls 34. By placing the seam 51 in this location, the face sheets 40, 42 can lend maximum support to the seam and the frame is capable of supporting equipment over its entire surface area.

After the honeycomb core 38 is in place, another layer of prepreg sheet 44 is applied to the outside of the honeycomb core to begin formation of the outer face sheet 42 of the frame 12. The prepreg sheets 44 are compacted and added just as with the inner face sheet 40.

A thin layer (0.005") of film adhesive is placed between the inner face sheet 40 and honeycomb core 38 and outer face sheet 42 and honeycomb core. This adhesive ensures a good bond between the face sheets 40, 42 and the honeycomb core 38. The use of film adhesive in this manner is well known in the art.

Figure 7:
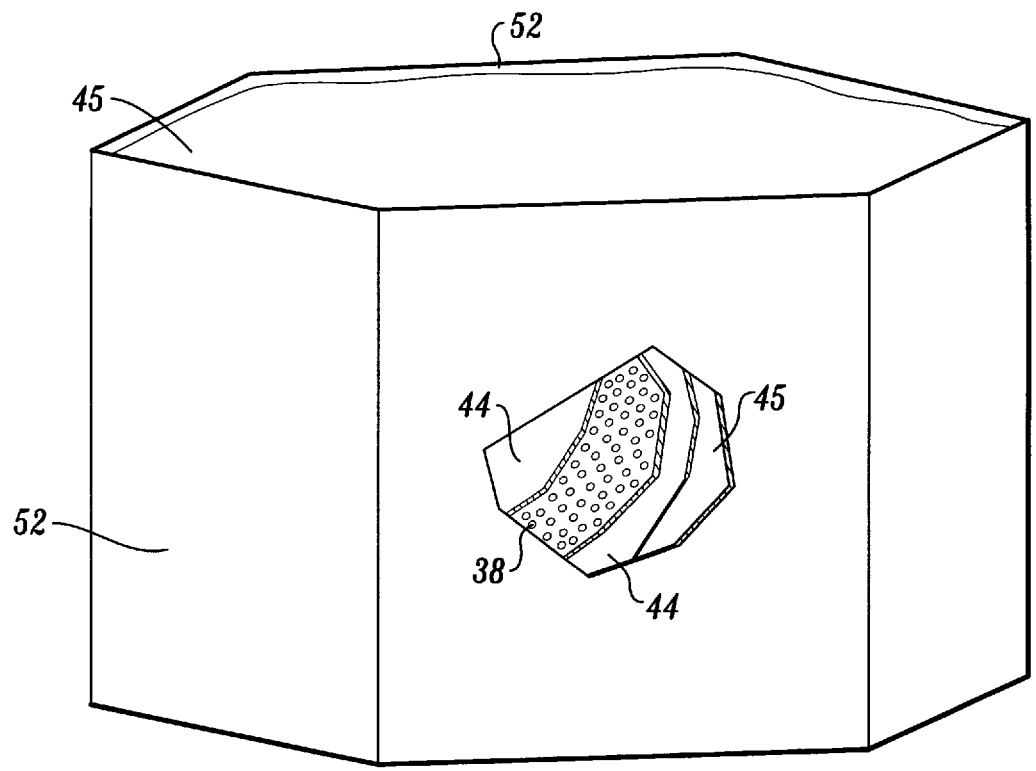
FIG. 7 is a partial cutaway, side perspective of the aluminum mandrel shown in FIG. 4 showing a still further state of assembly of the frame and displaying a thin plate placed over the prepreg sheets making up the outer face sheet, the aluminum core, and the prepreg sheets making up the inner face sheet of the frame.

After compaction of the final layer of the prepreg sheet 44, the vacuum bag 50, the fiberglass breather 48, and the one-piece flexible blanket 46 are removed and a thin gage plate 52 is extended over the outer prepreg sheet 44 (FIG. 7). The thin gage plate 52 is preferably an aluminum caul plate. Preferably, this thin gage plate 52 is configured such as to cover the entirety of the outermost prepreg sheet 44 and so as to overlap at an adjoining edge. The aluminum mandrel 45, along with the honeycomb core 38, the prepreg sheets 44 forming the inner and outer faced sheets 40, 42, and the thin gage plate 52 are then placed in an autoclave and the prepreg sheets 44 are cured at approximately 35 psi. Although typical pressures of an autoclave for similar composites are 85–100 psi, the present method utilizes the lower pressure, which has been found to minimize fiber breakage at the honeycomb core 48/face sheet 40, 42 interfaces. Preferably, the inner and outer face sheets 40, 42 are co-cured and co-bonded; that is, both face sheets are cured and bonded to the honeycomb core 38 in one step. The thin gage plate 52 is used to minimize dimpling of the thin composite face sheets during the 35 psi cure.

The prepreg sheets 44 are cured at a time and temperature which is appropriate for the polymer matrix chosen. A person of ordinary skill in the art will determine an appropriate time and temperature of the cure based on the matrix, but for the cyanate ester matrix described, it has been found that a cure at 250° for 3 hrs. has achieved a satisfactory result.

After the cure, the frame 12 and the aluminum mandrel 45 are removed from the autoclave and allowed to cool. Because of the significant differences between the thermal expansions of the aluminum and the polymer matrix/fiber composite, the aluminum mandrel 45 shrinks after cure to a size which permits easy removal of the frame 12.

It is unnecessary that the honeycomb core 38 have a consistent cross-section. In fact, the honeycomb pattern may be more dense at a desired location so as to sustain a higher shear or compression load. In addition, the wall thickness of the core may be increased at a region of high stress. The face sheets 40, 42 may also be varied by changing the ply orientation, or adding additional plies so as to strengthen the frame 12 in a desired location.

Once the prepreg sheets 44 have been cured and the face sheets 40, 42 are complete, the access openings 32 may be cut in desired locations for accessories to be placed on the satellite 10. The access openings 32 in the frame 12 do not require structural covers, giving ready access to internal components. Before launch, the access openings 32 are covered with multi-layer insulation (not shown, but known in the art). Interfacing systems (not shown, but well known in the art) may be attached to the top and bottom decks 24, 26 at an off-site location. The decks 24, 26 may then be secured to the frame 12 in a conventional manner, such as by bolts or by bonding.

The frame 12 offers many benefits and advantages not utilized in prior art spacecraft frames. Conventional spacecraft structures generally include a frame having a number of flat panels connected by many complex fittings, longerons, and cross-ties. The flat panels are generally reinforced by rib stiffeners to prevent shear and compression buckling. In contrast, the frame 12 for the satellite 10 of the present invention is a one-piece structure with no joints or seams. The use of the honeycomb core 38 and the fibers in the polymer matrix for the inner and outer face sheets 40, 42 provides adequate structure for mounting spacecraft equipment directly to side panels, without additional secondary stiffening.

While the presently preferred embodiment of the invention has been illustrated and described, it will be appreciated that within the scope of the appended claims various changes can be made therein without departing from the spirit of the invention.

The embodiments of the invention in which an exclusive property or privilege is claimed are defined as follows:

1. A unitary, tube-shaped spacecraft frame comprising:

a core configured in the tube shape of the outer shell of the spacecraft and having an inner circumference and an outer circumference;

a first continuous composite layer formed from lagers of prepreg sheets and comprising fibers in a polymer matrix, the first continuous composite layer covering the inside of the core and extending in a continuous layer around the inner circumference of the core; and a second continuous composite layer formed from layers of prepreg sheets and comprising fibers in a polymer matrix, the second composite layer covering the outside of the core and extending in a continuous layer around the outer circumference of the core.

2. The spacecraft frame of claim 1, wherein the core comprises a honeycomb structure.

3. The spacecraft frame of claim 2, wherein the core comprises a one-piece aluminum sheet formed to the shape of the frame.

4. The spacecraft frame of claim 1, wherein the core comprises a one-piece aluminum sheet formed to the shape of the frame.

5. The spacecraft frame of claim 4, wherein the first composite layer is substantially continuous such that it does not contain seams.

6. The spacecraft frame of claim 5, wherein the second composite layer is substantially continuous such that it does not contain seams.

7. The spacecraft frame of claim 1, wherein the first composite layer is substantially continuous such that it does not contain seams.

8. The spacecraft frame of claim 7, wherein the second composite layer is substantially continuous such that it does not contain seams.

9. The spacecraft frame of claim 1, wherein the first and second composite layers comprise cyanate ester in the polymer matrix.

10. The spacecraft frame of claim 9, wherein the fibers in the first and second composite layers comprise high modulus graphite.

11. The spacecraft frame of claim 10, wherein the fiber comprises approximately 53 to 55 volume percent of the first and second composite layers.

12. The spacecraft frame of claim 10, wherein the fiber volume is approximately 55%.

13. The spacecraft frame of claim 1, wherein the fibers in the first and second composite layers comprise high modulus graphite.

14. The spacecraft frame of claim 13, wherein the fiber comprises approximately 53 to 55 volume percent of the first and second composite layers.

15. The spacecraft frame of claim 14, wherein the fiber volume is approximately 55%.

16. The spacecraft frame of claim 1, wherein the first and second layers of composite comprise epoxy in the polymer matrix.

17. The spacecraft frame of claim 1, wherein the core includes walls which are thickened regionally so as to support a higher load.

18. The spacecraft frame of claim 1, wherein the core comprises a honeycomb structure and the honeycomb structure is more dense in a specific region whereby the more dense region may support a higher load.

* * * * *